United States Patent

[11] 3,623,473

| [72] | Inventors | Harold W. Andersen;<br>Charles H. Harrison, both of Oyster Bay, N.Y. |
|------|-----------|---|
| [21] | Appl. No. | 789,255 |
| [22] | Filed | Jan. 6, 1969 |
| [45] | Patented | Nov. 30, 1971 |
| [73] | Assignee | H. W. Andersen Products, Inc.<br>Oyster Bay, N.Y. |

[54] METHOD FOR DETERMINING THE ADEQUACY OF BLOOD CIRCULATION IN A LIVING BODY
5 Claims, 2 Drawing Figs.

[52] U.S. Cl. .................................................. 128/2 R, 73/342, 128/2.05 V
[51] Int. Cl. ........................................................ A61b 10/00
[50] Field of Search........................................... 128/2, 2.05 F, 2.05 M, 2.05 S, 2.05 V, 2.1, 2.05 R; 73/359, 341, 342

[56] References Cited
UNITED STATES PATENTS

| 1,622,887 | 3/1927 | Smith | 128/2 |
| 1,648,899 | 11/1927 | Hayman | 128/2 |
| 1,935,784 | 11/1933 | Smith | 128/2 |
| 2,888,918 | 6/1959 | Pierce et al. | 128/2 |
| 3,023,398 | 2/1962 | Siegert | 128/2 UX |
| 3,245,402 | 4/1966 | Barnes | 128/2 |
| 3,258,969 | 7/1966 | Poirier | 73/359 |
| 3,335,716 | 8/1967 | Alt et al. | 128/2 |
| 3,339,542 | 9/1967 | Howell | 128/2 |

OTHER REFERENCES
Body Function Recorder, Honewell Co. publication, Dec. 8, 1961, 4 pages, (copy in GR335, 128/2.1R)

*Primary Examiner*—Richard A. Gaudet
*Assistant Examiner*—Kyle L. Howell
*Attorney*—Frank J. Jordan ABSTRACT: A method for determining the adequacy of blood circulation in a human or animal body by measuring the difference in temperature between at least two suitable points by means of two temperature-sensitive elements excited by voltages of predetermined magnitude and phase, including a reference voltage for comparing the pulses derived from the temperature-sensitive elements and providing for an indication at a signal level different from a threshold level.

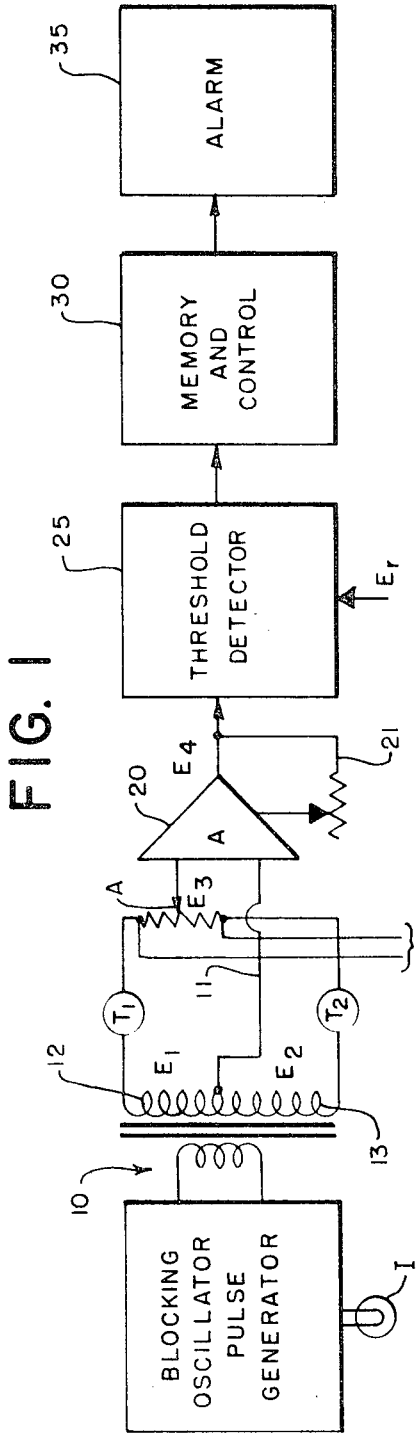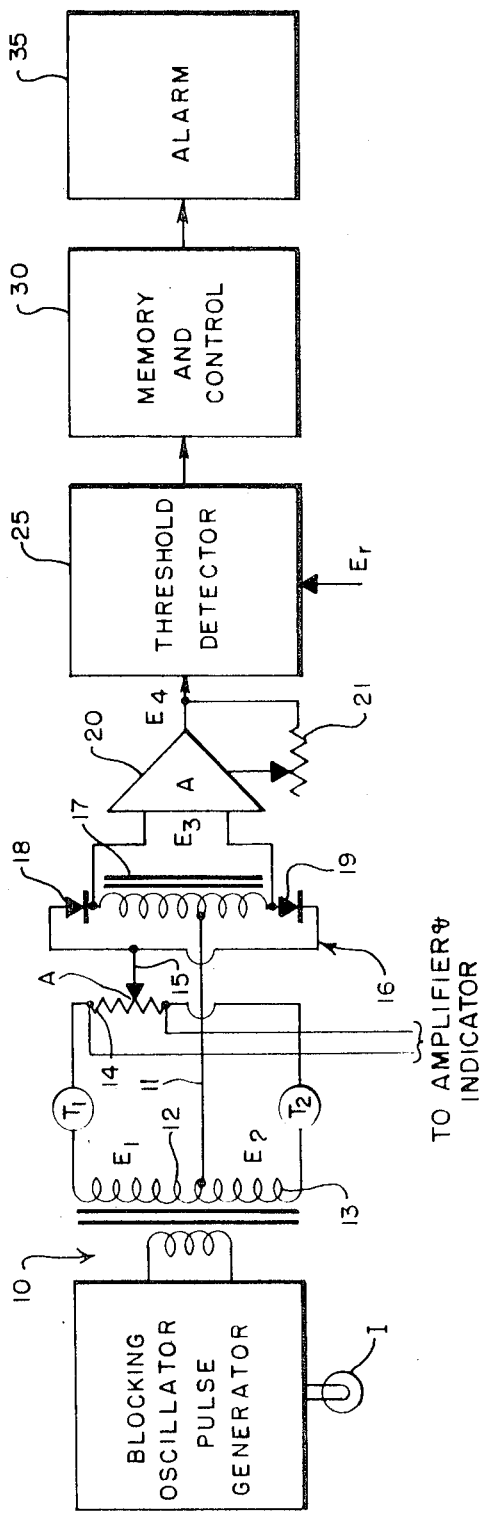

METHOD FOR DETERMINING THE ADEQUACY OF BLOOD CIRCULATION IN A LIVING BODY

FIELD OF THE INVENTION

The present invention relates generally to a skin-temperature-measuring method and more particularly to a temperature-measuring method for monitoring the difference in temperature between a portion of a limb which has adequate circulation and a more remote portion of the same limb to ascertain whether or not said limb has adequate circulation.

BACKGROUND OF THE INVENTION

Conventionally, after a surgeon has applied a plaster cast to an arm or leg, he instructs the hospital nursing staff to observe the distal end of the limb (fingers or toes) for color and skin temperature. These observations, crude and unsophisticated as they may be, can provide the nurse with an indication of the adequacy of blood circulation, and have prevented the loss of many limbs because of the strangulation effects of a cast which has become too tight on the limb, thus acting as a tourniquet and restricting blood flow. Despite this observation procedure, limbs occasionally are lost when the time between the loss of circulation to the distal limb (hand or foot) and the time that the nurse notes a decrease in the distal limb temperature of sufficient magnitude to alert her, exceeds the survival time for the limb without adequate blood circulation. Such a potential disaster is easily avoided, if the deficient circulation is discovered in time, by removing the cast or "bivalving" it, the latter being a method of loosening without removing the cast.

In recent years, with the rapid improvement in vascular surgical techniques, many limbs, especially legs, have been revascularized by direct surgical correction of the circulatory defect. This is frequently done by replacing diseased or injured arteries. Postoperative care includes observation of the distal portions of the limb for color and skin temperature to detect restricted blood flow. The surgeon knows, from bitter experience, that a blood6arteries, and the limb will die if circulation is not surgically restored immediately.

Since time is of the essence, and since it is well recognized that the skin temperature of the human limb is a function of the adequacy of its circulation, it may be wondered why it is not conventional to record and follow the skin temperatures of such patients in the same routine manner, and with the same degree of accuracy, that core temperatures are observed and recorded. Part of the reason is that conventional, inherently calibrated, clinical mercury thermometers are inadequate, whereas sophisticated electronic devices are not generally available to the hospital because of their complexity, the difficulty of maintaining their calibration, and the relatively high cost of obtaining and servicing such electronic equipment.

BRIEF SUMMARY OF THE INVENTION

It is an object of the invention to overcome this deficiency in current hospital practice and to provide a method for skin temperature monitoring which is readily applicable to the patient.

It is another object of the invention to measure the difference in temperature between the portion of the limb which has adequate circulation, and the extremity which may not have adequate circulation.

Briefly, the invention in one aspect thereof provides a method of determining the adequacy of circulation of blood by measuring the skin temperatures of suitable points on the body of a human being or other animal.

The invention will become more readily apparent from the following description of preferred embodiments thereof shown, by way of example, in the accompanying drawings, in which:

FIG. 1 is a block diagram of the general apparatus in accordance with the invention; and FIG. 2 is a block diagram similar to FIG. 1, illustrating modification with the interchangeable feature of the temperature sensing elements.

DESCRIPTION OF THE PREFERRED EMBODIMENT

With reference to FIG. 1, the blocking oscillator pulse generator 10 provides across its split secondary 12, 13, voltage pulses $E1$ and $E2$ of predetermined amplitude and predetermined polarity relationship to temperature-sensing elements $T1$ and $T2$, which, for example, may be thermistors of preselected characteristics, and which are placed in temperature-sensing relationships with different skin portions, such as a proximal and a distal portion of a limb. During its operation current from the blocking oscillator, if flowing properly through the temperature sensing elements, is then amplified and flashes an indicating lamp 1 to signal that it is functioning. The blocking oscillator pulse transformer 10 is shown for illustrative purposes to have a center tapped (11) secondary. The output voltage pulses for the temperature sensing elements are summed as $E3$ at a point A, this sum is amplified by the pulse amplifier 20 whose gain is controllable by feedback circuit 21 and appears as $E4$ at the input to the threshold detector 25. The threshold detector 25 compares the amplitude of $E4$ with a reference voltage $E_r$. If $E4$ exceeds the reference voltage $E$ the threshold detector 25 provides a signal to a memory and control block 30 which activates an alarm generator 35 providing an audible or visual alarm to the monitoring personnel. By controlling the gain of the pulse amplifier 20 the amount of voltage at point A which will activate the threshold detector 25 and signal an alarm may be varied. For example, a large gain will permit activating the threshold detector with a small voltage at point A. As the voltage pulse at point A is the algebraic sum of the outputs of the two temperature-sensitive elements, $T_1$ and $T_2$ a large amplifier gain corresponds to maximum sensitivity to temperature differences at the sensing elements. By calibrating the gain of the amplifier, which is controlled by the feedback circuit, the sensitivity to temperature differentials may also be calibrated.

With reference to another modification of the present invention as shown in FIG. 2, the center tap 11 of the secondary winding 12 of the blocking oscillator pulse transformer 10 is connected with a center tap of an autotransformer 17. Temperature sensitive resistors $T_1$ and $T_2$ are connected between common summing point A and end terminals of pulse transformer 10, respectively. The voltage pulse resulting at the summing point A is applied to end terminals of the tapped autotransformer 17 through diodes 18 and 19. To select the particular sections of the winding of the autotransformer 17 that is to receive the pulse by responding to the polarity of the pulse, diode 18 is connected in forward direction to pass a voltage pulse of the positive polarity whereas diode 19 is connected for blocking this positive pulse. The autotransformer 17 provided inversion of the reversed pulse, thereby making it the proper polarity; it does nothing to the pulse if it is already of the polarity for which the subsequent amplifier 20 and comparator circuits 25, 30 and 35 are adjusted.

This arrangement permits that the temperature sensing elements $T_1$ and $T_2$ may become interchangeable, that is, either of them can be placed distally or proximally.

The method according to the invention involves the detection of the difference in skin temperature between a proximal and distal portion of a limb to which a cast may have been applied, or alternatively, the differences in skin temperatures between the same relative distal points on an encased limb and its partner, e.g., between two big toes. In either case, one of the temperature-sensing elements $T_1 T_2$ is placed at either the distal or proximal point and the elements are connected in circuit relationship with the apparatus of the invention as shown in FIGS. 1 or 2. Since the absolute skin temperature of a limb is a function of the circulation to that limb, and since the temperature of a limb decreases normally with increasing distance from the core of the body due to loss of heat to the atmosphere by conduction, radiations, convection, and the cooling effect of evaporating skin surface moisture it follows that there is a difference in temperature between two separated proximal and distal points on a limb regardless of either the absolute temperature of the limb or the temperature of the surrounding atmosphere. This difference in temperature will be greater or lesser according to conditions, but there will always be a difference. In accordance with the method of the present invention, in which the proximal skin temperature becomes the reference point rather than utilizing a temperature standard exterior to the limb against which the distal skin temperature is measured, simple comparators may be utilized to detect temperature difference. Further, present limits of temperature difference may be utilized which are selected as clinically significant differences, rather than displaying the information numerically. By using the proximal skin temperature as the reference standard against which the distal temperature is compared, and by designing the apparatus to function on the basis of preset limits of allowable temperature difference, rather than in displaying absolute numerical temperature differences, the apparatus is greatly simplified and made considerably more economical.

The method in accordance with the invention may also be applied to determined other body functions or malfunctions which may be measured by differential temperatures. An example might be determining the adequacy of circulation in a skin graft, or monitoring the possibility of impaired circulation to the distal portion of a limb following surgery, or as the result of a substantial physical damage after an accident.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What is claimed is:

1. The method of indicating the difference in temperature between two locations on a human body or other animal comprising sensing the temperature at one location, producing voltage pulses proportional to the temperature at said one location, sensing the temperature at another location, providing voltage pulses proportional to the temperature at said other location, comparing said voltage pulses, and producing a signal to actuate an indicating device when the difference between said compared voltage pulses exceeds a predetermined threshold value, said voltage pulses being thereby utilized to determined the adequacy of blood circulation between said two locations.

2. The method according to claim 1 including temperature-sensing elements wherein said voltage pulses are of predetermined amplitude and predetermined polarity relative to said temperature-sensing elements.

3. The method according to claim 2 wherein said temperature-sensing elements are thermistors.

4. The method of measuring the difference in temperature between two points of a human body or other animal comprising sensing the temperature at one point, providing voltage pulses proportional to the skin temperature at said one point, sensing the temperature at another point, providing voltage pulses proportional to the skin temperature at said other point, adding said voltage pulses, algebraically, comparing the aforesaid added voltage with a reference voltage, producing a signal in response to a difference between said compared voltages, and producing another signal exceeding a predetermined threshold value between said compared voltages.

5. The method according to claim 4 further comprising amplifying said added voltage before comparing the latter.

* * * * *